United States Patent
Pettre (10) Patent No.: US 10,417,843 B2
(45) Date of Patent: Sep. 17, 2019

(54) METHOD FOR PREDICTING AN OPERATIONAL MALFUNCTION IN THE EQUIPMENT OF AN AIRCRAFT OR AIRCRAFT FLEET

(71) Applicant: Jean-Hugues Pettre, Paris (FR)

(72) Inventor: Jean-Hugues Pettre, Paris (FR)

(*) Notice: Subject to any disclaimer, the term of this patent is extended or adjusted under 35 U.S.C. 154(b) by 317 days.

(21) Appl. No.: 15/112,533

(22) PCT Filed: Jan. 20, 2015

(86) PCT No.: PCT/FR2015/050138
§ 371 (c)(1),
(2) Date: Jul. 19, 2016

(87) PCT Pub. No.: WO2015/107317
PCT Pub. Date: Jul. 23, 2015

(65) Prior Publication Data
US 2016/0340059 A1    Nov. 24, 2016

(30) Foreign Application Priority Data

Jan. 20, 2014   (FR) ..................... 14 50434

(51) Int. Cl.
*G07C 5/08*      (2006.01)
*G05B 23/02*     (2006.01)
(Continued)

(52) U.S. Cl.
CPC ............. *G07C 5/085* (2013.01); *B64D 45/00* (2013.01); *B64F 5/60* (2017.01); *G05B 23/024* (2013.01); *G05B 23/0283* (2013.01)

(58) Field of Classification Search
CPC .......... B64F 5/0045; B64F 5/60; B64D 45/00; G05B 23/024; G05B 23/0283; G07C 5/085
(Continued)

(56) References Cited

U.S. PATENT DOCUMENTS 5,719,566 A * 2/1998 Readman ........... B64D 45/0005
                                                                244/178
6,499,114 B1 * 12/2002 Almstead ........... G05B 19/4184
                                                                 714/25
(Continued)

OTHER PUBLICATIONS

International Search Report, dated May 28, 2015, from corresponding PCT application.

*Primary Examiner* — Muhammad Shafi
(74) *Attorney, Agent, or Firm* — Young & Thompson (57) ABSTRACT

Method for predicting an operational malfunction in an aircraft equipment, the parameters of the equipment being monitored and recorded during flights by measurements or signals, the aircraft further including an equipment breakdown detection unit, the breakdown also being recorded in the aircraft memory. During maintenance phases between flights, measurements and breakdowns are retrieved on a programmable computer to form a database, and (a) a data analysis program is executed, a first time, to determine a set of pairs of parameter pairs whose signals develop positively over time in a correlated manner and in the absence of a breakdown, and (b) once the set of parameters pairs has been determined, a detection program is executed to calculate correlations for the pairs in the determined set of pairs and, when the calculated correlation value of one pair for a given flight falls below a predetermined positive detection threshold, a malfunction is reported.

17 Claims, 8 Drawing Sheets

(51) Int. Cl.
*B64D 45/00* (2006.01)
*B64F 5/60* (2017.01)

(58) Field of Classification Search
USPC .......................................................... 701/29.3
See application file for complete search history.

(56) References Cited

U.S. PATENT DOCUMENTS

| | | |
|---|---|---|
| 2003/0014692 A1 | 1/2003 | James et al. |
| 2003/0083794 A1* | 5/2003 | Halm .................... B64D 47/00 701/29.4 |
| 2005/0033527 A1* | 2/2005 | Wada ...................... G01D 3/08 702/35 |
| 2005/0197805 A1 | 9/2005 | Eryurek et al. |
| 2010/0070237 A1* | 3/2010 | Yitbarek ................ G06Q 10/06 702/177 |
| 2012/0143436 A1* | 6/2012 | Cornet ................... G07C 5/085 701/33.4 |
| 2013/0274964 A1 | 10/2013 | Jesse et al. |

* cited by examiner

METHOD FOR PREDICTING AN OPERATIONAL MALFUNCTION IN THE EQUIPMENT OF AN AIRCRAFT OR AIRCRAFT FLEET

BACKGROUND OF THE INVENTION

Field of the Invention

The present invention relates to a method for predicting an operational anomaly of the equipment of an aircraft of a fleet of aircraft. It has applications in the field of aircraft maintenance.

Description of the Related Art

In the course of the operation of an aircraft, the onboard electronic systems which monitor the equipment of the aircraft and record measurements of parameters of the equipment's status or operation may furthermore generate fault messages which are also recorded. These measurements and messages are stored in one or more memories during the operation of the aircraft, and are thereafter extracted and recovered by the engineer during the inter-flight maintenance phases.

After the flight, for maintenance, the ground engineer extracts the messages and, for each message, the engineer will execute a process to search for confirmation or non-confirmation of malfunction. On completion of this process, the malfunction is either confirmed, or unconfirmed. This process is time-consuming since numerous messages of the same type are produced at each flight, thus compelling the engineer to intervene on the aircraft even for repetitive messages that do not, in fact, entail any real malfunction.

To reduce maintenance time, there is proposed a method for analyzing the recorded measurements so as to forewarn the engineer of an anomaly that has not necessarily degenerated into a fault message in the course of the flight but which may be the sign of a future fault. The invention thus makes it possible to act preventively with respect to faults.

Furthermore, the maintenance may relate to an aircraft fleet which comprises several aircraft of one and the same type, that is to say aircraft that are constructed in the same manner and therefore comprise the same equipment. Hence, it is beneficial to be able to use information relating to a set of aircraft of one and the same type so as to improve maintenance, this being what the proposed method allows.

In its principle, the invention is based on searching for a loss of correlation between recorded measurements or signals of parameters tracked during the operation of the aircraft in the course of flights. Firstly, a search is made for strong correlations between signals for flights in the course of which there has been no fault. The corresponding parameters are retained and, for other flights, in practice the latest flights, a search is made as to whether there has been no loss of correlation between these same parameters and therefore the corresponding signals. As a simplifying measure, the correlations concerned are those between two signals. Therefore, correlations for pairs of signals are more particularly considered. A loss of correlation for the pair is then indicative of an anomaly. In variants, it is possible to consider correlations for three (triplets) signals or more signals.

Document US2013/274964 discloses a system for tracking and validating data, in which data are eliminated according to validation criteria, one of which is based on a correlation between data. The data eliminated from the subsequent analysis are those which have lost their correlation. This document does not teach an implementation of a correlation for the analysis of the data with a view to predicting anomalies and, in all cases, it renders this impossible because the decorrelated data are eliminated.

BRIEF SUMMARY OF THE INVENTION

Thus the invention relates to a method for predicting an operational anomaly of the equipment of an aircraft of a fleet of aircraft of the same type, each item of said equipment of each aircraft having at least one operational or state parameter, said parameters being tracked in the course of flights, over time, by measurements of equipment parameters recorded in a memory of the aircraft, said recorded measurements, also called signals, being pinpointable in time and for the corresponding parameter and for the corresponding item of equipment and for the corresponding aircraft, the aircraft furthermore comprising a means for detecting faults of the equipment, said faults also being recorded in the memory of the aircraft, said recorded faults also being pinpointable in time and for at least the corresponding item of equipment and for the corresponding aircraft, the recorded measurements and the recorded faults being furthermore pinpointable for each corresponding flight.

According to the invention, during the inter-flight maintenance phases, the recorded measurements, or signals, and possible fault(s) are copied into a programmable processor so as to form a database of signals of aircraft of the fleet, and:

a) during an inter-flight maintenance phase, a data analysis program is executed in the processor, at least a first time, on the database of aircraft signals, and with said data analysis program:

a set of pairs of parameters is determined for which the signals of the pair evolve in a positively correlated manner over time and in the absence of any recorded fault for at least one given flight of at least one of the aircraft of the fleet, the correlation corresponding to a calculation result greater than a positive determined correlation threshold for the value of correlation between signals of the pair, b) during an inter-flight maintenance phase, once the set of pairs of parameters has been determined, whether this be during the maintenance phase in the course of which said determination of pairs was performed or during a maintenance phase subsequent to the maintenance phase in the course of which said determination of pairs was performed, a first detection program is executed in the processor on the database of aircraft signals, and with said first detection program:

the correlations are calculated for the pairs of the determined set of pairs for one or more flights subsequent to those that served for said determination of pairs, and when the value of the calculated correlation of a pair for the or a given flight falls below a positive determined detection threshold, then a first type of anomaly is signaled for the item or items of equipment corresponding to the signals of the pair for said flight in its entirety.

The terms "recorded measurements" and "signals" are equivalent in the context of the invention.

In various modes of implementation of the invention, the following means that may be used alone or according to all technically possible combinations, are employed:

during the determination of the set of pairs of parameters for which the signals of the pair evolve in a positively correlated manner in the course of time and in the absence of any recorded fault for at least one given flight of at least one of the aircraft of the fleet, said parameters of the pair must be parameters tracked in all the aircraft of the fleet, equivalently, during the analysis program, a set of pairs of parameters is determined for which the signals of the pair evolve in a positively correlated manner in the course of time and in the absence of any recorded fault for at least one given flight of at least one of the aircraft of the fleet, the correlation corresponding to a calculation result greater than or equal to a positive determined correlation threshold for the value of correlation between signals of the pair, equivalently, during the first detection program, the correlations are calculated for the pairs of the determined set of pairs for one or more flights subsequent to those that served for said determination of pairs, and when the value of the calculated correlation of a pair for the or a given flight falls below or becomes equal to a positive determined detection threshold, then a first type of anomaly is signaled for the item or items of equipment corresponding to the signals of the pair for said flight in its entirety, the pairs are determined within recorded measurements, or signals, for parameters originating from one and the same item of equipment, the signals of a pair always corresponding to one and the same given item of equipment, different pairs being able to originate from different equipment, each pair of parameters corresponds to two signals of one and the same item of equipment, the pairs are determined within recorded measurements, or signals, for parameters that may originate from different items of equipment, the signals of a pair being able to correspond to two different items of equipment, pairs of parameters can correspond to signals of two different items of equipment, preferably, the pairs are determined over a set of flights from the past for which no fault has been recorded, the pairs are determined over a set of successive flights from the past for which no fault has been recorded up to, but not including, a first flight from said past for which a fault has been recorded, the pairs are determined over a set of flights from the past, in which the signals of flight(s) are excluded for which a fault has been recorded for the item of equipment corresponding to the excluded signal, in addition to or in replacement for step b):

c) during an inter-flight maintenance phase, once the set of pairs of parameters has been determined, whether this be during the maintenance phase in the course of which said determination of pairs was performed or during a maintenance phase subsequent to the maintenance phase in the course of which said determination of pairs was performed, a second detection program is executed in the processor on the database of aircraft signals, and with said second detection program: the correlations for the pairs of the determined set of pairs for one or more flights subsequent to those that served for said determination of pairs are calculated over determined time periods of each flight, each period making it possible to define a block of data in the signals of the database of the processor, and when the value of the calculated correlation of a pair in the considered period of the or of a given flight falls below a positive determined detection threshold, and possibly becomes equal to this threshold, then a first type of anomaly is signaled for the item or items of equipment corresponding to the signals of the pair for said considered period of said flight, the time periods have identical durations, a given flight being sliced into equal time periods, the time periods have durations that may be variable and that correspond to a determined flight phase, the flight phases being in particular taxiing, takeoff, cruising flight, landing, the variation of the correlation between two successive periods of each flight for which the correlations per periods for the pairs of the determined set of pairs have been calculated is furthermore calculated for each period, and when the value of the calculated variation of a pair between the two successive considered periods of the or of a given flight exceeds a determined threshold of variation and, preferably signaling a decrease in the correlation of the pair from one period to the next, a second type of anomaly is signaled for the item or items of equipment corresponding to the signals of the pair for said two considered periods of said flight, for a given flight, the variation of the correlation for the first period of the flight is calculated between the first period and the second period and the variation of the correlation for the second period or the following of the flight is calculated between said period and the just previous period, the variation of correlation between two periods is calculated by differencing between the values of the correlation coefficients of the corresponding periods, the variation of correlation between two periods is calculated by the absolute value of the difference between the values of the correlation coefficients of the corresponding periods, the correlations are Pearson or Spearman correlations, for the execution of the data analysis program, use is made of a correlation threshold equal to 0.7, the pairs of parameters having to have a calculation result of greater than 0.7 for the value of correlation between signals, the sets of pairs are determined and the detection program executed individually for each given aircraft of the fleet, the signals of the various aircraft of the fleet not being used together in common for the data analysis program and the detection program, the results of correlation calculations of the detection program(s) are represented graphically and to represent the correlation information per flight or per period, the difference with 1 of the correlation calculation result is used so that a correlation which remains strong is represented close to zero and in that the correlation calculation result is bounded between [0-1] so that correlations that have become negative are displayed at 1, more generally and for all the calculations the difference with 1 of the correlation calculation result is used so that a strong correlation is close to zero, the calculations of the detection program(s) are limited to a subset of the set of determined pairs, said subset corresponding to a statistical selection of the pairs of the set, the selection corresponding in particular to one or more of the following criteria:

a maximum number of pairs, the pairs having the least variation between flights in the case where several flights are used for determining the set of pairs, the pairs having the least variation between aircraft in the case where several aircraft are used for determining the set of pairs, The recorded measurements and/or the recorded faults are furthermore pinpointed for the corresponding flight, The recorded measurements and/or the recorded faults are pinpointable for each corresponding flight by comparison with temporal information regarding the start and end of each flight, said temporal information being able not to be or being able to be recorded in the memory of the aircraft.

The invention relates finally to a programmable computing means comprising software and hardware means allowing the implementation of the method of the invention. There is also considered a medium for computer data comprising a program intended for a computer and allowing it to execute the method of the invention. More specifically, a computer program which comprises code-forming means able to execute, when they are executed on a computer, the method of the invention. Finally there is considered a memory medium, readable by a computer, storing a program which is the computer program of the invention.

BRIEF DESCRIPTION OF THE DRAWINGS

The present invention, without however being limited thereby, will now be exemplified with the following description of embodiments and modes of implementation in conjunction with.

DETAILED DESCRIPTION OF THE PREFERRED EMBODIMENTS

Within the framework of the presentation of the invention, an item of aircraft equipment is, in general, either an engine member, e.g. a pump (the/one of its measurable parameters may then be the absorbed intensity), a controlled valve (the/one of its measurable parameters may then be its open or closed position) or a mechanical member, e.g. a flap (the/one of its measurable parameters may then be the angular position of said flap) or, else, a system or part of a system, e.g. a fluidic circuit (the/one of its measurable parameters may then be the pressure of the fluid or its flowrate) or an electrical circuit (the/one of its measurable parameters may then be the voltage or the current flowing). Indeed, in order to facilitate the management of the equipment, it is possible to group the equipment together per system, for example the equipment of the fuel system, the equipment of the electrical system, etc. It is understood that these groupings can be carried out according to several levels of precision.

It is possible to extend this notion of measurable parameter of the equipment to the systems or even to the aircraft globally such as for example the "flight" parameter (the measurements being able to produce two states: in-flight/not in-flight) or "taxiing" (the measurements being able to be two states: taxiing/not taxiing). Thus, the parameters can also correspond to measurements relating to the operation of the aircraft in general. Such is in particular the case for the speed, the altitude, the exterior temperature, the atmospheric pressure, etc. which are parameters which can also be measured and recorded. Indeed, correlations could exist between such parameters and those of equipment of the aircraft. A batch number for an element of an item of equipment can also be considered to be a measurable parameter for example it is possible to detect a defective batch. The signals may therefore originate directly from the aircraft, this being the general case, or be added subsequently, for example a flight identifier or an equipment element batch number or any other signal that may be useful.

The parameters of the aircraft are therefore monitored during the flights, and even optionally outside of the flights properly speaking, and they are measured and they are recorded in the form of recorded measurements, also termed signals. These signals or recorded measurements are recovered (connection 6), in a database 5 from a processor 4 of an aircraft 1 (FIG. 7) for analysis during maintenance between flights (FIG. 8, operation 102). The processor is typically a microcomputer. Conventionally, these signals are pinpointable according to various criteria and, in particular time, the parameter and/or the item of equipment corresponding thereto, the flight concerned and the aircraft concerned. This means that for a given recorded measurement, it is possible to know the moment of the measurement, to which it corresponds: in practice to which parameter it corresponds, to which flight it belongs and to which aircraft it belongs. This is obtained directly and/or indirectly according to the case: for example, for the time, a temporal variable is associated with each measurement, or, else, the temporal moment at which the measurements start and the periodicity of the measurements are known, and the moment of a particular measurement can be deduced therefrom.

Figure 7:
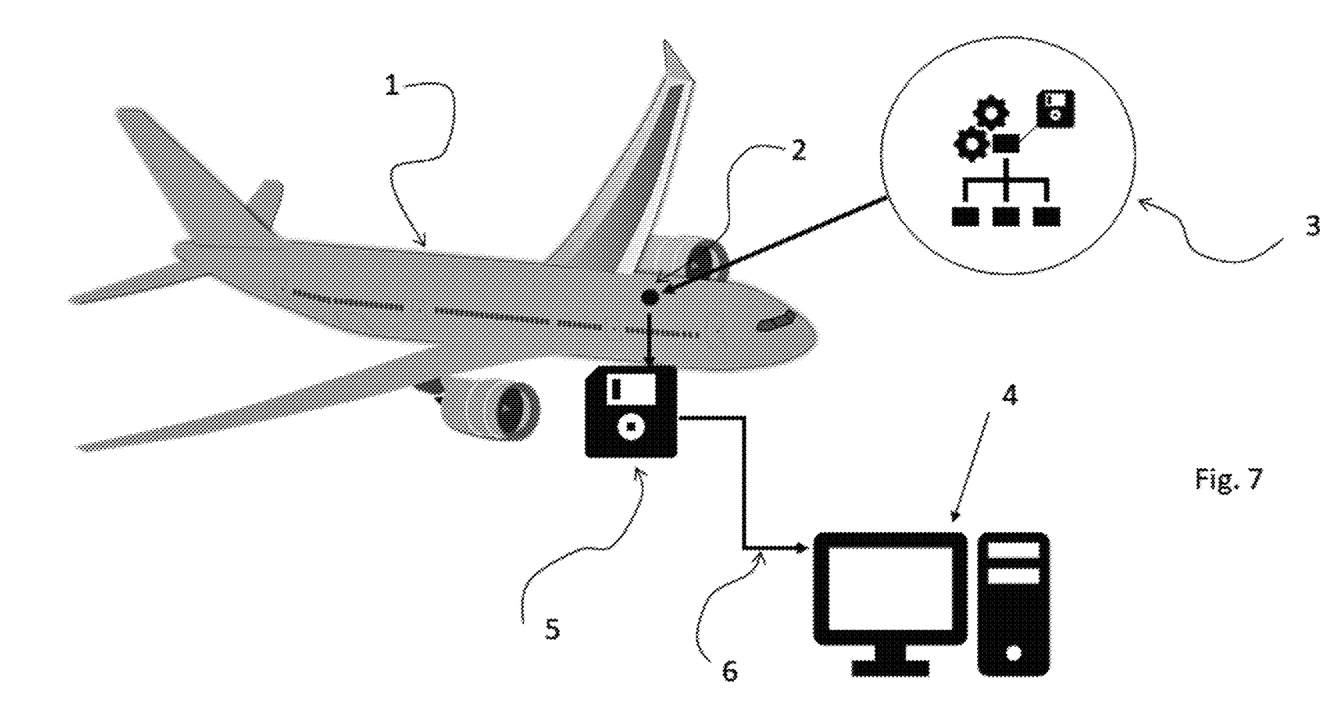
Figure 8:
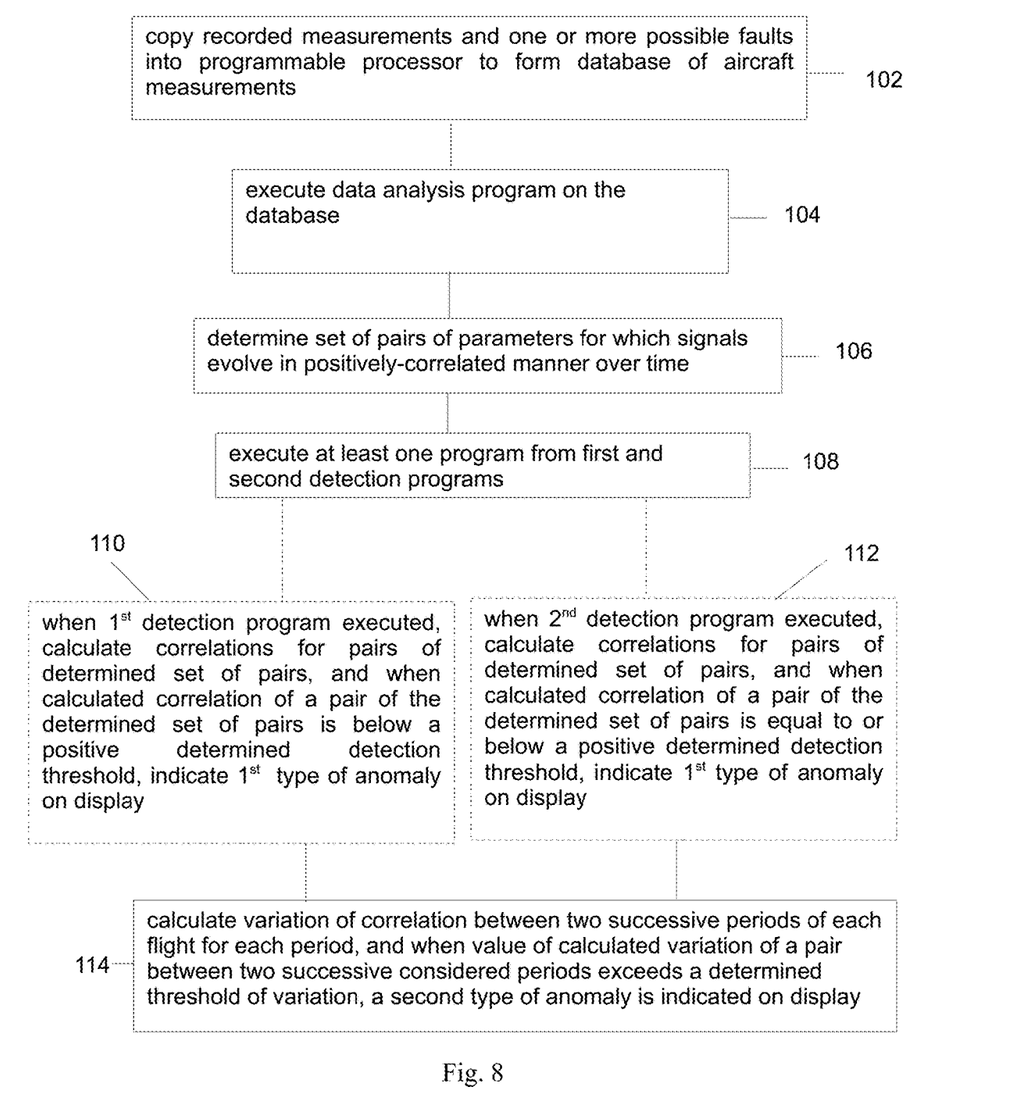

In practice, the aircraft 1 incorporates a flight recorder 2, 3, as illustrated in FIG. 7, which is a fault detector. This flight recorder 2, 3 is in charge of recording the various signals of the aircraft 1 throughout the flight. This recording constitutes one of the prime commodities of the method. The example given here will be more specifically concerned with the fuel system. The parameters or signals set forth represent the fuel system of the tanks at the tip and in the center of the wings of the aircraft and they are identified by their names with, for example: CURM_20QN2_3_1, CURM_20QN2_2_1, CURM_20QN2_1_1, CURM_20QN1_3_1, CURM_20QN1_2_1, CURM_20QN1_1_1, CURM_11QL2_3_1, CURM_11QL2_2_1, CURM_11QL2_1_1, CURM_11QL1_3_1, CURM_11QL1_2_1, CURM_11QL1_1_1, CURM_10QL2_3_2, CURM_10QL2_2_2, CURM_10QL2_1_2, CURM_10QL1_3_2, CURM_10QL1_2_2, CURM_10QL1_1_2, CURM_9QL2_3_2, CURM_9QL2_2_2, CURM_9QL2_1_2, CURM_9QL1_3_2, CURM_9QL1_2_2, CURM_9QL1_1_2, CURM_6QA4_3_2, CURM_6QA4_2_2, CURM_6QA4_1_2, CURM_6QA1_3_1, CURM_6QA1_2_1, CURM_6QA1_1_1, CURM_5QA4_3_1, CURM_5QA4_2_1, CURM_5QA4_1_1, CURM_5QA1_3_2, CURM_5QA1_2_2, CURM_5QA1_1_2, CURM_20QA1_3_2, CURM_13QN2_3_1, CURM_13QN2_2_1, CURM_13QN2_1_1, CURM_13QN1_3_1, CURM_13QN1_2_1, CURM_13QN1_1_1, FVLVBROTSH_1_1, FVLVBROTOP_1_1, FVLVBRMTSH_1_1, FVLVBRMTOP_1_1, FVLVBLOTSH_1_1, FVLVBLOTOP_1_1, FVLVBLMTSH_1_1, FVLVBLMTOP_1_1, FVLVARMTSH_1_1, FVLVARMTOP_1_1, FVLVALMTSH_1_1, FVLVALMTOP_1_1, FQWT_RO_1, FQWT_RM_1, FQWT_LO_1, FQWT_LM_1, FPMPBROTPS_1_1, FPMPBROTEN_1_1, FPMPBRMTPS1_1, FPMPBRMTEN_1_1, FPMPBLOTPS_1_1, FPMPBLOTEN_1_1, FPMPBLMTPS_1_1, FPMPBLMTEN_1_1, FPMPARMTPS_1_1, FPMPARMTEN_1_1, FPMPALMTPS_1_1, FPMPALMTEN_1_1.

The signals of CURM (Current Measure) type represent the current expressed in Amperes flowing in the SSPC (Solid State Power Control) driving the fuel pumps. The 4 succeeding characters allow the identification of the Sub-System. The 3 succeeding digits allow identification of the wing (1=left wing, 2=right wing), the phase number (three-phase) and the element number (1=normal element, 2=backup element).

The signals of FQWT (Fuel Quantity Weight) type represent the quantity of fuel expressed in kilograms remaining in a tank. The 2 succeeding characters allow identification of the tank concerned (RO=right outer, LO=left outer, MO=middle outer, LO=left outer).

The signals of FVLV (Valve) type represent the open or closed status of the fuel valves. The succeeding character represents the main system or the backup system (A, B). The 3 succeeding characters represents the identification of the tank concerned (RMT=right middle tank, LMT=left middle tank, LOT=left outer tank, ROT=right outer tank). The last 2 characters represent the nature of the status (OP=Open, SH=Shut).

The signals of FPMP (Pump) type represent the unsupplied or pressurized status. The last 2 characters represent the nature of the status (EN=Energized, PS=Pressure switch).

Furthermore, the aircraft generates reports triggered by a previously configured event such as landing, takeoff etc. This report is a photograph of value of certain signals at the moment of an event. Finally the aircraft records all of the fault messages. A fault message contains a time of occurrence, a reference of a system (Air Transport Association ATA code), a message class: warning (WN) or failure (FR) and a textual message.

Initially, it is necessary to determine pairs of parameters, also termed pairs of signals, for which the two signals of the pair have variations over time which track one another, that is to say, which evolve in the same manner, within the framework of the normal operation of the aircraft (operations 104, 106). To this end, a calculation of correlation between pairs of recorded parameters or of signals is used in the search for the pairs having the strongest correlation. As is known, the result of a correlation calculation can vary from −1 (anti-correlation), through 0 (no correlation), to +1 (correlation). Positive correlations, that is to say close to 1, are considered in the example represented. It is understood that if negative correlations (anti-correlation) exist, this implies that the signals are also mutually related during normal operation and that in implementation variants of the invention it is possible to use these negative correlations and search for the fact that they modify one another for anomaly detection. In another variant, for signals with negative correlation, it is possible to undertake an inversion calculation on one of the signals to obtain a correlation calculation result which is positive instead of negative.

In the example described more specifically, use will therefore be made of the pairs of parameters whose correlation calculation results are close to +1 for each flight without consideration of fault signaling, the limit being fixed at 0.7: a pair of signals is retained if its correlation calculation result is greater than 0.7. A set of indicative pairs of parameters or signals is thus obtained, which will serve during the subsequent searches for anomalies.

The correlation coefficient considered is the Pearson or Spearman coefficient between two signals for a flight. A correlation of greater than 0.7 is considered to be a strong correlation. This allows the observation of the degradation of the correlation from one flight to another.

It is understood that this determination of the pairs is carried out over a history of flights, in practice a database into which the signals are transferred after each flight. This history can thus be supplemented in tandem with the flights. It is therefore possible to repeat the determination of the pairs over time, subsequent to new flights. However, it is ensured that this determination is performed on flights on which faults have not been signaled and, if possible, flights which are almost certainly very representative of normal operation of the aircraft. Indeed, in the case of slow and progressive loss of correlation it would be possible to lose one or more pairs without an anomaly having been detected. It is understood that it is possible to implement other criteria for selecting the flights and/or signals used for determining the pairs.

For the displays during the depiction of the results by the processor 4, it is preferred to invert the correlation calculation results, that is to say that in the case where the signals are strongly correlated with one another (result of the correlation calculation dose to +1), a value close to 0 is displayed and therefore, in case of graphical representation, only a small area is displayed. To this end, the correlation calculation result is differenced with 1 and a correlation value which is inverted with respect to the direct or raw correlation value is obtained. It is understood that this is a convention of the program, in particular for depicting the results, and that it is possible to use some other.

Hereinafter, the result deducted from 1 of the correlation calculation on a pair of signals will be called "CIL C".

Figure 1:
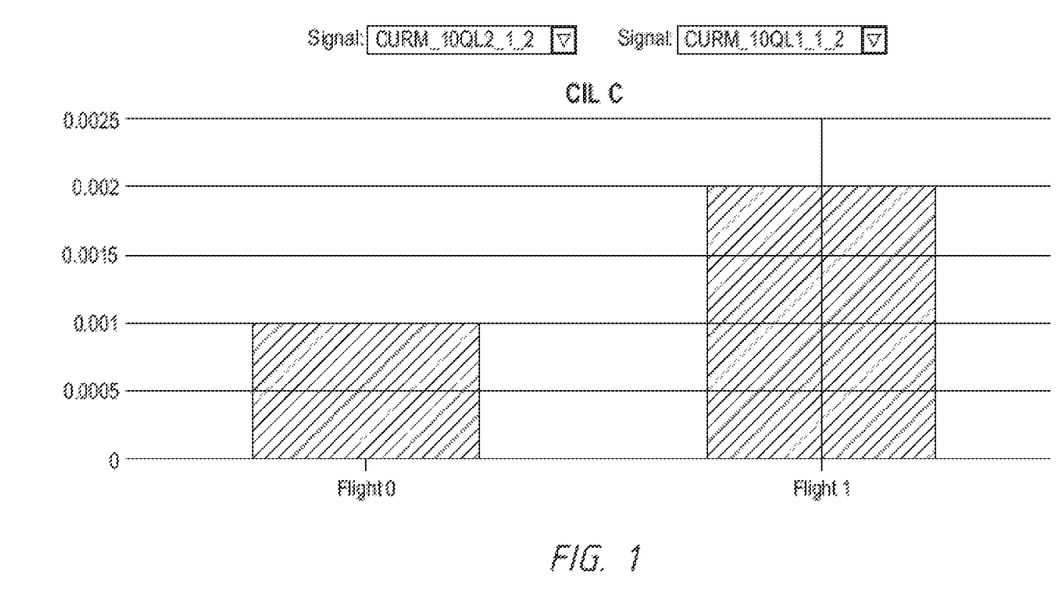
FIG. 1 which represents a depiction of calculation results for the correlation of a pair of signals over two successive flights of one and the same aircraft B, FIG. 2 which represents a depiction of the signals of the pair of one of the two flights of the aircraft B of FIG. 1, FIG. 3 which represents a depiction of results of correlation calculations for the pair of signals of FIG. 1 in successive flights of another aircraft H, FIG. 4 which represents a depiction of the signals of the pair of one of the flights of the aircraft H of FIG. 3 for which there was a loss of the correlation, FIG. 5 which represents a depiction of the signals of the pair of FIG. 3, of the calculations of correlation per periods and superposition of results of calculating variation in correlation for said pair of signals for two flights of the aircraft H, FIG. 6 which represents for a given flight the variations of correlation between periods or blocks of data of a particular pair of signals, FIG. 7 which schematically illustrates a flight recorder of an aircraft in accordance with one or more embodiments, and FIG. 8 which illustrates a flow chart of one or more embodiments of the present invention.

In FIG. 1, the CIL C of two successive flights of an aircraft B have been represented. These CIL C have low representation values, 0.001 for flight 0 and 0.002 for flight 1, thereby implying that the signals of the pair are strongly correlated since the representation results from the difference with 1 of the correlation calculation which has therefore yielded 0.999 and 0.998 respectively. In this instance the signals of the pair are: CURM_10QL2_1_2 and CURM_10QL1_1_2. A correlation calculation had been performed during the determination of the pairs and for this pair it has indeed yielded results greater than the threshold of 0.7 required to retain the pair and, consequently, this is indeed an indicative pair.

Note in FIG. 1, the existence of a cursor on flight 1 which makes it possible to obtain a detailed display of the characteristics of this flight. More generally, the following parameters in particular are found on the displays: flight number, flight date, duration, departure time, arrival time, fuel, Apply, Reset, value, aircraft.

Figure 2:
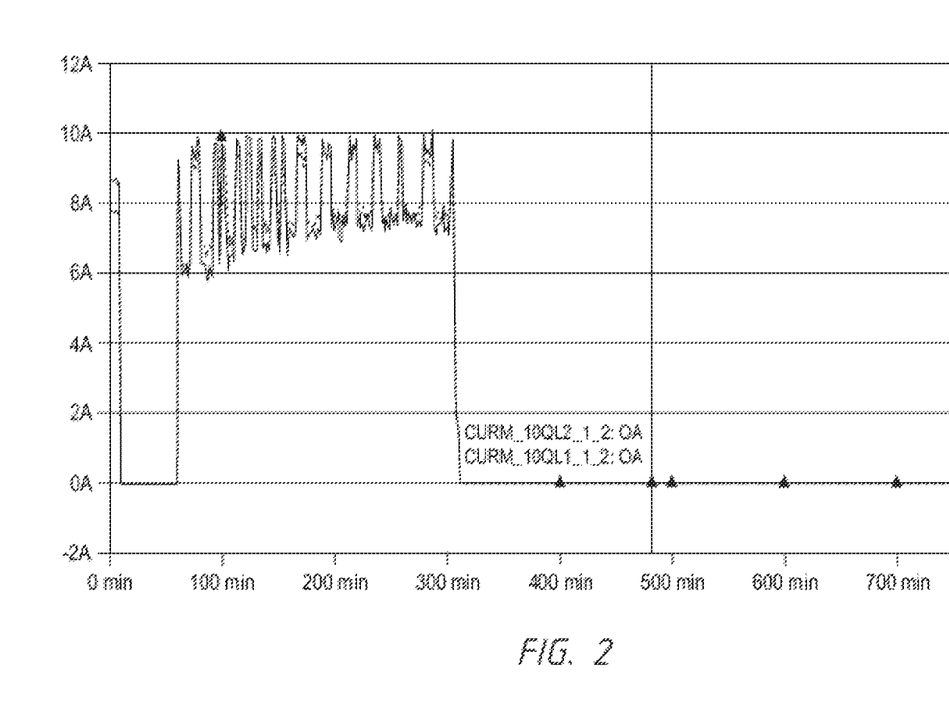

In order to better understand this notion of correlation, the two signals of the pair of FIG. 1 for flight 1 of this aircraft B have been represented in FIG. 2. It is indeed noted, visually, that the two signals of this indicative pair have similar behaviors, explaining the result of the calculation of correlation for this pair.

To summarize: in a first step, the relationships between the variables are analyzed and pairs of variables of first significance are determined on the basis of a correlation calculation (operation 106). To establish a list of such pairs of correlated variables, the correlations between all the possible pairings of variables for all the recorded flights are calculated. One and the same pair will be present as many times as there are flights, if it was possible to calculate it in all the flights. The rule for selecting pairs of first significance is taken to be: a pair is considered to be of first significance and preserved in the list of pairs if the 0.7 quantile of the set of correlations of this pair is greater than or equal to 0.7. This tolerance makes it possible to track the evolution of pairs that are in general well correlated and to search for possible correlation breaks. Owing to this rule, variables whose mutual correlation coefficient is very low are not taken into account as regards pair of first significance, this corresponding to the great majority of possible pairings of variables that can be analyzed.

Note that it may be useful to perform a preprocessing of the variables before the detection of the pairs of first significance and their analysis. Such is the case in particular for the variables relating to the engines of the aircraft. An algorithm is therefore used to filter the flight data about the engine system. In particular, not all the variables of type N1V and TRAV are used and the some of the measurements are removed since they are not considered to pertain to the operation of the engine system but to depend greatly on the commands.

Firstly, about 4 min of flight data relating to the variables N1V are removed at the start and at the end of the flight respectively. In practice, the data preserved for the variables N1V are only those while the four engines are on and are operating.

The variable TRAV makes it possible to detect possible asymmetries in the position of the control throttles which could introduce a bias in other parameters. They are considered as mirror pairs: engine 1 and 4 on the one hand, engine 2 and 3 on the other hand. The recorded measurements which correspond to moments in the flight where the absolute value of the difference between the two pairs is greater than 1.5 are discarded from the analysis.

Once the indicative pairs have been determined, interest will turn thereafter to the corresponding parameters for flights, normally subsequent to those which served for the determination, and their correlation will be calculated in the search for a loss of this correlation (operations 110, 112).

Figure 3:
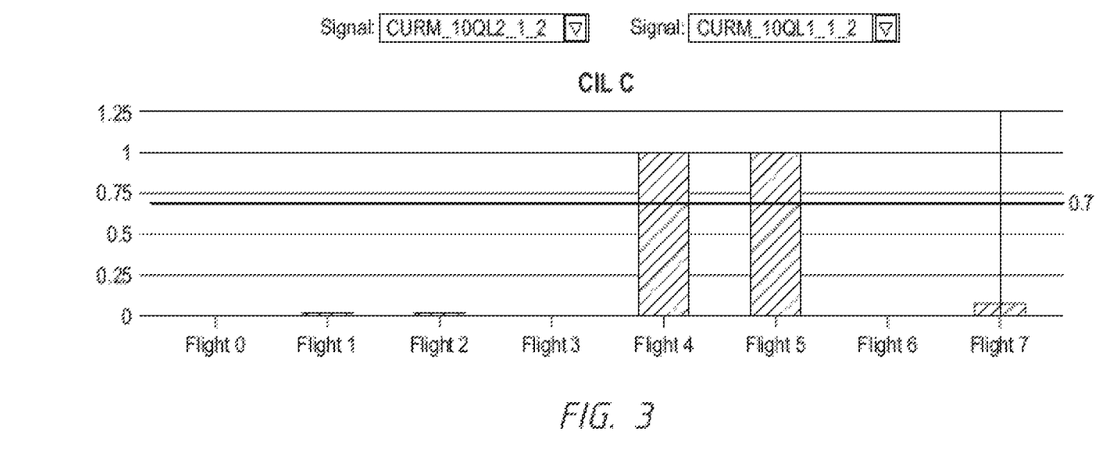

For example, in FIG. 3, the correlation calculations have been performed for the same pair CURM_10QL2_1_2 and CURM_10QL1_1_2 on flights of another aircraft, aircraft H which is of the same type as aircraft B, and the CIL C are represented for a series of 7 flights. It may be noted that the representation of the CIL C for flights 0, 1, 2, 3 and 6 is low indicating the persistence of a strong correlation of these signals of the pair. On the other hand, for flights 4 and 5 the CIL C are practically at 1 depicting total decorrelation of the signals of the pair, a fault having probably even been recorded during these flights. For flight 7, the CIL C is represented with a value of 0.0789 which deviates from the CIL C values for flights 0, 1, 2, 3 and 6. It can therefore already be visually detected for flight 7 that something abnormal has happened. It is understood that this anomaly detection can be automated through a simple threshold overshoot calculation. This threshold can be a fixed value or result from a calculation, e.g. mean, over CIL C values having certain determined characteristics, e.g. themselves less than another threshold.

Figure 4:
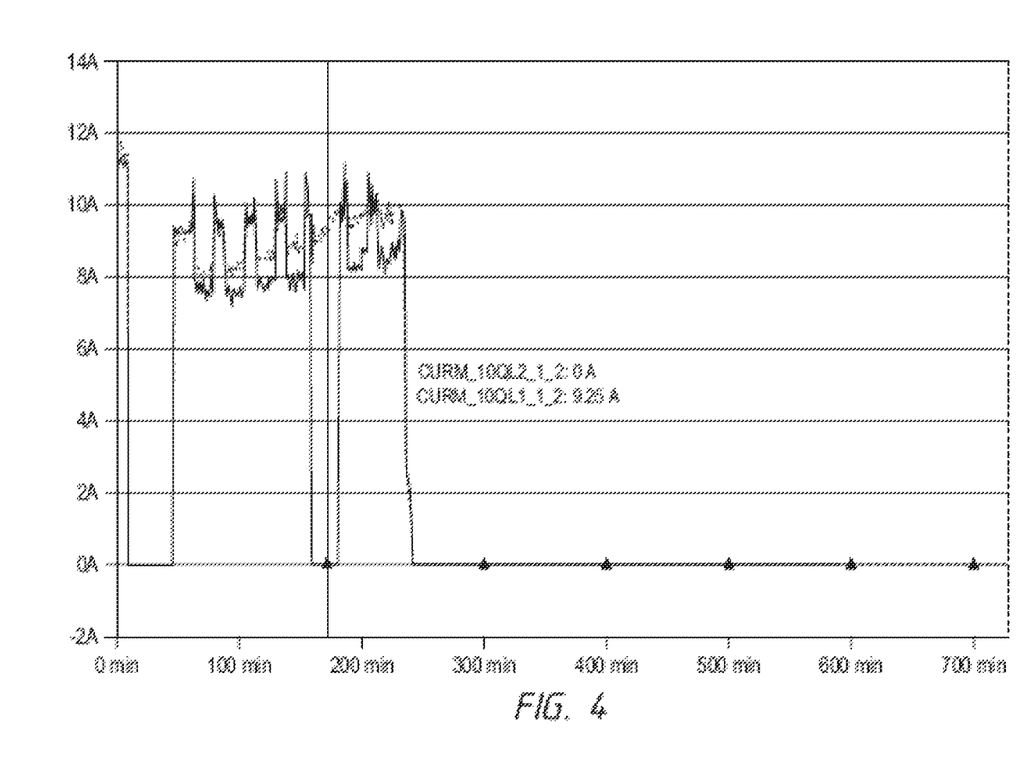

In fact, the existence of this CIL C at 0.0789 can be explained with FIG. 4 which represents the signals of the pair for the corresponding flight. The presence is noted therein of an abnormal behavior of one of the signals of the pair, one of the electrical phases falling to zero whilst the other preserves a high amperage value.

Figure 5:
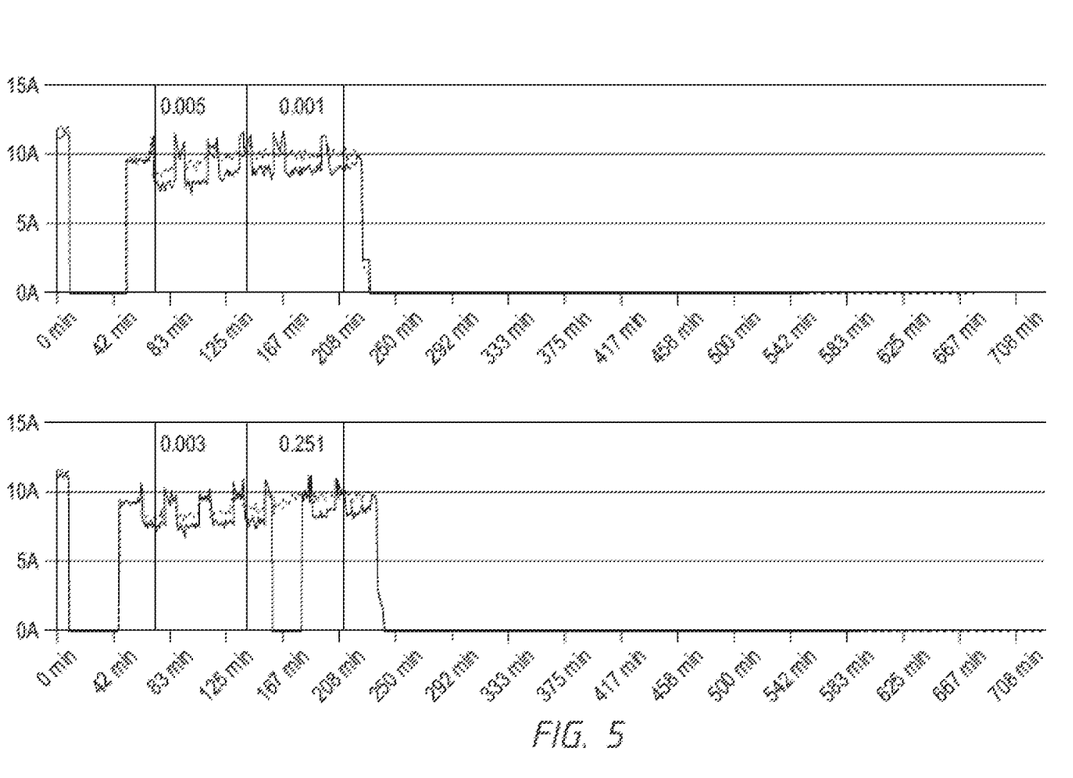

This anomaly detection which is done globally per flight (operation 110), can be refined by a detection per flight periods (operation 112), a flight period corresponding to a "block" of data of the signals. In the given example, the periods are equal time periods into which the flight is sliced. For example, a flight can be divided into 10 equal time periods. Thus, represented superimposed in FIG. 5 are the signals of the same pair CURM_10QL2_1_2 and CURM_10QL1_1_2 for flights 6 and 7 as well as some of the periods or blocks hatched in grey and the values of variation of the correlation or "slope" between the periods. For flight 6, at the top of FIG. 5, the variation of correlation between periods is low: 0.005 and 0.001 respectively. The same holds for the first period of flight 7 at the bottom of FIG. 5, where the variation in correlation is low at 0.003. On the other hand, for the second period of flight 7, the variation in correlation is significant at 0.251 and corresponds to the previously signaled abnormal behavior of the signals. It can therefore also be visually detected for flight 7 that something abnormal has happened on account of the large value of the variation in correlation (operation 114). It is understood that this detection can be automated through a simple threshold overshoot calculation. This threshold can be a fixed value or result from a calculation, e.g. mean, on variations of correlation that have certain determined characteristics, e.g. themselves less than another threshold.

Figure 6:
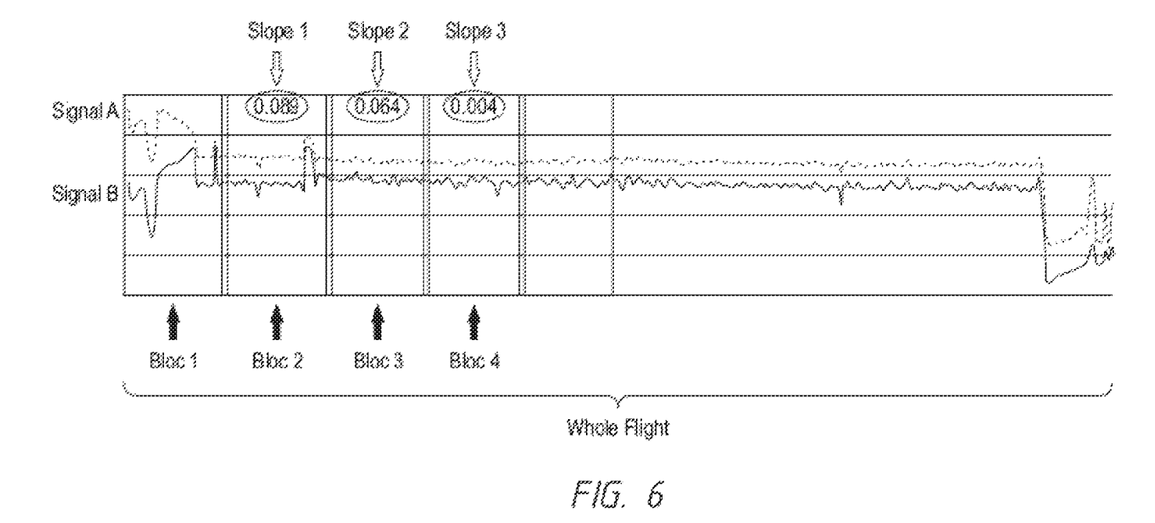

The way to calculate the variations of the correlation or "slope" between the periods will now be explained in conjunction with FIG. 6. The flight has been segmented into periods corresponding to blocks of recorded data. Of interest here is the signal pair made up of the signal A and of the signal B. The first block considered is block 1 situated at the start of the flight, on the left in FIG. 6. The inverted correlation calculation has been implemented, that is to say the CIL values for the pair of signals in question. A first CIL has been calculated for block 1, a second for block 2, etc. The variation of CIL or slope is calculated by differencing between two CILs of successive blocks. The slope 1 for block 2 has the value 0.089 and is calculated by [CIL(signal A, signal B) of block 2]−[CIL(signal A, signal B) of block 1]. The slope 2 for block 3 has the value 0.064 and is calculated by [CIL(signal A, signal B) of block 3]−[CIL(signal A, signal B) of block 2]. The slope 3 for block 4 has the value 0.004 and is calculated by [CIL(signal A, signal B) of block 4]−[CIL(signal A, signal B) of block 3]. The principle for calculating the slope is therefore to take the difference of the CILs with the block preceding the block considered. If the slope had been calculated for block 1, the reverse difference would have been taken, that is to say with respect to block 2 (succeeding and not preceding), by convention, given that there is no block before block 1. It is understood that these conventions are exemplary and that, as an alternative, the slope calculation principle can use the difference with the succeeding block.

To summarize, in a second analysis step, losses of correlation within the pairs of first significance are searched for. To this end, a correlation coefficient in the Pearson sense is calculated to measure the linearity of the relationship between two time series of variables of the pairs of first significance of one and the same flight. Preferably these time series correspond to temporal blocks/data periods. A deviation index called CIL C is calculated, defined on the basis of the correlation coefficient (in the Pearson sense):

$$CIL = 1 - \frac{|\overline{\mathrm{Cov}(X, Y)}|}{\sigma X \cdot \sigma Y}$$

where $\overline{\mathrm{Cov}(X,Y)}$ denotes the covariance between the series $X$ and $Y$.

The aim being here to track the evolution of these coefficients for a given pair of first significance over time so as to be able to pinpoint the moments at which the values deviate from one another and the correlation passes below a certain threshold on the basis of which it is considered that the correlation level is no longer satisfactory. If the linear relation which linked the two variables is no longer linear, then an atypical behavior is liable to be observed. It is then possible to go back to the signals concerned during the flight for further information and a diagnosis.

In practice, the data of flights contain parameters which are of several types: continuous signals which evolve over time and take their values in a defined interval, and binary signals (dichotomous variables) which are in fact bits coding a particular status (equal to 0 or 1 for, for example: opening/closing, powered or not powered, etc. . . . ).

The following calculation schemes are used to calculate the CILs according to the different types of variables:

| Variable Type 1 | Variable Type 2 | CIL C scheme |
| --- | --- | --- |
| Continuous | Continuous | Pearson Coefficient |
| Dichotomous | Dichotomous | Spearman Coefficient |
| Continuous | Dichotomous | Pearson Coefficient |

For the continuous+dichotomous pairs of variables, the correlated pairs are identified beforehand. For example, it is possible to consider amperage signals and the bits for valve opening, for power supply to a switch . . . .

As explained and in order to generate more specific correlation indicators which correspond to a specific part of the flight studied, the data are divided into blocks. Thus, for a given pair of first significance, we go from one CIL C per flight to $n$ CILs C per flight, where n is the number of subdivisions/blocks desired within the flight. The calculation of the CIL C remains the same per blocks but the data range over which it is calculated will evolve as a function of the chosen number of subdivisions/blocks. The larger is n, the more the precision is increased but the more unwieldy is the analysis process.

In addition to the predictive use of the means of the invention, it is also possible to implement the invention in a retrospective mode by starting, for the data analysis, from a flight V for which at least one fault has been recorded and by considering the previous flights V−1, V−2 . . . so as to determine therein an evolution of the correlations, called a "pattern", for at least one pair of parameters. More specifically, the evolution of the correlation or "pattern" of a given pair is determined over a determined number of flights, typically 5, comprising as last flight the flight V of the recorded fault, i.e. typically the flights V−4, V−3, V−2, V−1 and V. For the given pair, the correlations are calculated for these flights and these correlations form said "pattern". These correlations can be the raw/direct correlations or, else, the inverted correlations which correspond to CILs. Preferably, the values of inverted correlations or CILs are used. In a variant, this evolution or "pattern" rather than being a series of values, is a linear combination of these values according to a determined function. In a particular case that can be likened to the linear combination, the flights in question are grouped together and the correlation or its inverse is calculated over the set of these flights, thus making it possible to obtain a unique value for the evolution or "pattern".

Once this evolution or "pattern" has been determined, the set of flights is scanned in the history in search, by comparison, of a similar evolution or "pattern" over a series of one and the same number of successive flights, typically 5 flights, like a mobile window in the flights history. It is understood that this search is performed by performing the same types of calculations on these historic successive flights as those performed to determine the initial evolution or "pattern" in order for the comparison to be indicative. For the comparison, acceptance or non-acceptance thresholds are preferably implemented, rather than a search for equality in the evolutionary trends. For example, in the case where the evolution or "pattern" corresponds to a unique value, this "pattern" is searched for in the history by defining a tolerance threshold s, and the "pattern" is considered to have been retrieved if: value calculated over a window of the history—initial value (that calculated with the flight V)<s. It is thus possible to determine the number of times that the "pattern" in question is retrieved in the history. It is understood that this a posteriori analysis can also serve for a predictive analysis by having firstly determined the "pattern/patterns" which are indicative of a given fault, that is to say in practice the indicative pair/pairs and the correlation value/values, and by using this "pattern" for comparisons with a new flight, the last flight (the most recent) of the comparison window being the new flight, the previous flights already being in the history.

Note that, preferably, in the case where calculations are performed per periods or blocks, these calculations are done within a given flight, that is to say the blocks considered belong to a given flight only.

| FRENCH | ENGLISH |
| --- | --- |
| Vol entire | Entire flight |
| Pente | Slope |

The invention claimed is:

1. A method for predicting an operational anomaly of equipment of an aircraft of a fleet of a same type of aircraft, each item of said equipment of each aircraft having at least one operating or state parameter, said parameter being tracked in the course of flights, over time, by measurements of equipment parameters recorded in a memory of the aircraft, said recorded measurements that are signals, pinpointable in time, for the corresponding parameter, the corresponding item of equipment, and the corresponding aircraft, the aircraft further including a fault detector configured to detect faults of the equipment, said faults being recorded in a memory of the aircraft, said recorded faults being pinpointable in time and for at least the corresponding item of equipment and the corresponding aircraft, the recorded measurements and the recorded faults being pinpointable for each corresponding flight, the method comprising:

during inter-flight maintenance phases, copying the recorded measurements and one or more possible faults into a programmable processor to form a database of aircraft measurements of the fleet, during at least one of the inter-flight maintenance phases, executing a data analysis program in the processor, at least a first time, on the database;

determining, with the data analysis program, a set of pairs of parameters for which the signals of the pair of the parameters evolve in a positively-correlated manner over time and in the absence of any recorded fault for at least one given flight of at least one of the aircraft of the fleet, the correlation corresponding to a calculation result greater than a positive determined correlation threshold for a value of correlation between signals of the pair of the parameters;

during at least one of the inter-flight maintenance phases, after the set of pairs of parameters is determined, executing at least one program from among a first detection program and a second detection program in the processor on the database of aircraft measurements, the executing occurring during the inter-flight maintenance phase when the determining of pairs of parameters is performed or during another inter-flight maintenance phase subsequent to the maintenance phase in when the determining the pairs of parameters is performed; and calculating, when the first detection program is executed, the correlations for the pairs of the determined set of pairs for one or more flights subsequent to one or more flights that served for said determination of pairs, and when the value of the calculated correlation of a pair of the determined set of pairs falls below a positive determined detection threshold, then indicating, on a display, a first type of anomaly for the item or items of equipment corresponding to the signals of the pair for said flight in its entirety, or calculating, when the second detection program is executed, the correlations for the pairs of the determined set of pairs for one or more flights subsequent to one or more flights that served for said determination of pairs over determined time periods of each flight, each time period defining a block of data in the signals of the database of the processor, and when the value of the calculated correlation of a pair of the determined pairs for the considered period falls below or becomes equal to a positive determined detection threshold, then indicating, on a display, a first type of anomaly for the item or items of equipment corresponding to the signals of the pair for said considered period of said flight.

2. The method as claimed in claim 1, wherein at least the second detection program is executed in the processor.

3. The method as claimed in claim 2, wherein the time periods have identical durations, a given flight being sliced into equal time periods.

4. The method as claimed in claim 3, wherein the variation of the correlation between two successive periods of each flight for which the correlations per periods for the pairs of the determined set of pairs have been calculated is furthermore calculated for each period, and when the value of the calculated variation of a pair between the two successive considered periods exceeds a determined threshold of variation and, preferably signaling a decrease in the correlation of the pair from one period to the next, a second type of anomaly is indicated, on the display, for the item or items of equipment corresponding to the signals of the pair for said two considered periods of said flight.

5. The method as claimed in claim 2, wherein the time periods have durations that are variable and that correspond to a determined flight phase, the flight phases being taxiing, takeoff, cruising flight, and landing.

6. The method as claimed in claim 5, wherein the variation of the correlation between two successive periods of each flight for which the correlations per periods for the pairs of the determined set of pairs have been calculated is furthermore calculated for each period, and when the value of the calculated variation of a pair between the two successive considered periods exceeds a determined threshold of variation and, preferably signaling a decrease in the correlation of the pair from one period to the next, a second type of anomaly is indicated, on the display, for the item or items of equipment corresponding to the signals of the pair for said two considered periods of said flight.

7. The method as claimed in claim 2, wherein the variation of the correlation between two successive periods of each flight for which the correlations per periods for the pairs of the determined set of pairs have been calculated is furthermore calculated for each period, and when the value of the calculated variation of a pair between the two successive considered periods exceeds a determined threshold of variation and, preferably signaling a decrease in the correlation of the pair from one period to the next, a second type of anomaly is indicated, on the display, for the item or items of equipment corresponding to the signals of the pair for said two considered periods of said flight.

8. The method as claimed in claim 2, wherein the correlations are Pearson or Spearman correlations.

9. The method as claimed in claim 2, wherein for the execution of the data analysis program, using a correlation threshold equal to 0.7, the pairs of parameters having a calculation result of greater than 0.7 for the value of correlation between signals.

10. The method as claimed in claim 2, wherein the sets of pairs are determined and the detection program executed individually for each given aircraft of the fleet, the signals of the various aircraft of the fleet not being used together in common for the data analysis program and the detection program.

11. The method as claimed in claim 2, wherein the results of correlation calculations of the one or more detection programs are represented graphically, and to represent the correlation information per flight or per period, the difference with 1 of the correlation calculation result is used so that a correlation which remains strong is represented close to zero and the correlation calculation result is bounded between [0-1] so that correlations that have become negative are displayed at 1.

12. The method as claimed in claim 2, wherein the calculations of the detection programs are limited to a subset of the set of determined pairs, said subset corresponding to a statistical selection of the pairs of the set, the selection corresponding to one or more of the following criteria:

a maximum number of pairs, the pairs having the least variation between flights in the case where several flights are used for determining the set of pairs, the pairs having the least variation between aircraft in the case where several aircraft are used for determining the set of pairs.

13. The method as claimed in claim 1, wherein the correlations are Pearson or Spearman correlations.

14. The method as claimed in claim 1, wherein for the execution of the data analysis program, using a correlation threshold equal to 0.7, the pairs of parameters having a calculation result of greater than 0.7 for the value of correlation between signals.

15. The method as claimed in claim 1, wherein the sets of pairs are determined and the detection program executed individually for each given aircraft of the fleet, the signals of the various aircraft of the fleet not being used together in common for the data analysis program and the detection program.

16. The method as claimed in claim 1, wherein the results of correlation calculations of the one or more detection programs are represented graphically, and to represent the correlation information per flight or per period, the difference with 1 of the correlation calculation result is used so that a correlation which remains strong is represented close to zero and the correlation calculation result is bounded between [0-1] so that correlations that have become negative are displayed at 1.

17. The method as claimed in claim 1, wherein the calculations of the detection programs are limited to a subset of the set of determined pairs, said subset corresponding to a statistical selection of the pairs of the set, the selection corresponding to one or more of the following criteria:

a maximum number of pairs, the pairs having the least variation between flights in the case where several flights are used for determining the set of pairs, the pairs having the least variation between aircraft in the case where several aircraft are used for determining the set of pairs.

\* \* \* \* \*